(12) United States Patent
Tezuka et al.

(10) Patent No.: US 9,304,507 B2
(45) Date of Patent: Apr. 5, 2016

(54) TOOL PATH DISPLAY APPARATUS HAVING DISPLAY UNIT FOR ACCELERATION OR JERK OF TOOL TIP POINT

(75) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 646 days.

(21) Appl. No.: 13/532,876

(22) Filed: Jun. 26, 2012

(65) Prior Publication Data

US 2013/0054182 A1 Feb. 28, 2013

(30) Foreign Application Priority Data

Aug. 25, 2011 (JP) .................. 2011-183512

(51) Int. Cl.
| | | |
|---|---|---|
| G01P 7/00 | (2006.01) | |
| G01C 3/08 | (2006.01) | |
| G01M 1/38 | (2006.01) | |
| G01B 5/28 | (2006.01) | |
| G05B 19/408 | (2006.01) | |
| G05B 19/4069 | (2006.01) | |

(52) U.S. Cl.
CPC .......... *G05B 19/408* (2013.01); *G05B 19/4069* (2013.01); *G05B 2219/35349* (2013.01)

(58) Field of Classification Search
CPC .................................. G05B 1/00; G05B 15/00
USPC .............. 702/40, 94, 115, 141, 158; 318/569; 425/145; 700/182
See application file for complete search history.

(56) References Cited

U.S. PATENT DOCUMENTS

| | | | | |
|---|---|---|---|---|
| 5,362,222 | A | * | 11/1994 | Faig et al. ...................... 425/145 |
| 8,010,302 | B2 | * | 8/2011 | Okita et al. ...................... 702/41 |
| 8,190,287 | B2 | * | 5/2012 | Iwashita et al. ............... 700/182 |
| 8,432,120 | B2 | * | 4/2013 | Iwashita et al. ............... 318/569 |

FOREIGN PATENT DOCUMENTS

| | | |
|---|---|---|
| DE | 60038578 T2 | 8/2008 |
| DE | 102010044534 A1 | 3/2011 |
| EP | 1102139 A2 | 5/2001 |
| JP | H04-033012 A | 2/1992 |
| JP | 7-28517 A | 1/1995 |
| JP | 3517909 B2 | 4/2004 |
| JP | 2009098982 A | 5/2009 |
| JP | 4648471 B2 | 3/2011 |

OTHER PUBLICATIONS

Office Action in corresponding German Patent Application No. 102012016434.3 dated Sep. 2, 2014, 10 pages.

* cited by examiner

*Primary Examiner* — Gregory J Toatley
*Assistant Examiner* — Felix Suarez
(74) *Attorney, Agent, or Firm* — Hauptman Ham, LLP

(57) ABSTRACT

A tool path display apparatus (20) includes a tool coordinate value calculation unit (22) that calculates tool commanded coordinate values and tool actual coordinate values, based on commanded value time series data of position commands for a plurality of axes, detected value time series data of position detected values for the plurality of axes, and the structure of a machine tool, an acceleration calculation unit (23) that calculates accelerations of a tip point of a tool using the tool commanded coordinate values and the tool actual coordinate values, and a display format selection unit (24) that selects display formats of the accelerations of the tool commanded coordinate values and the tool actual coordinate values.

5 Claims, 9 Drawing Sheets

TOOL PATH DISPLAY APPARATUS HAVING DISPLAY UNIT FOR ACCELERATION OR JERK OF TOOL TIP POINT

RELATED APPLICATIONS

The present application is based on, and claims priority from, Japanese Application Number 2011-183512, filed Aug. 25, 2011, the disclosure of which is hereby incorporated by reference herein in its entirety.

BACKGROUND

1. Technical Field

The present invention relates to a tool path display apparatus having a display unit for the acceleration or jerk of a tool tip point.

2. Description of Related Arts

Some of the numerical control apparatuses that are currently used to control machine tools have a function for displaying a position command path and a function for displaying the path on which a tool has actually moved. To be more specific, the coordinates of the tip point of a tool are calculated and displayed, from time series data of commanded positions and/or time series data of the actual positions of the drive axes of a machine tool. By this means, the shape error between the commanded path and the actual path of the tool tip point is visually analyzed.

As an example of such related arts, Japanese Patent No. 4648471 discloses calculating the three-dimensional coordinates of the tip part of a tool based on position information of the drive axes of a machine tool at each time, and information of the mechanical structure of the machine tool, and determining its path. Furthermore, Japanese Patent No. 4648471 discloses associating the path of a tool tip point and the accelerations of the drive axes of a machine tool and displaying them.

Furthermore, Japanese Patent No. 3517909 discloses displaying the acceleration of a tool feed axis, which is calculated from shape data of a workpiece, in the form of a graph, and determining corrected workpiece shape data by correcting an acceleration that is a singularity, equal to or above an acceleration threshold, to be equal to or below the threshold.

Furthermore, Japanese Patent Application Publication No. 2009-98982 discloses accurately simulating the path of a tool and/or the velocity of movement of the tool, prior to processing, and displaying the velocity, acceleration and jerk on a simulated tool path.

Incidentally, upon processing a workpiece with a machine tool, in order to have a desired machined surface on the workpiece, it is necessary to reduce the shape error of the actual position of a drive axis or a tool against the commanded position. Then, in order to analyze the cause resulting in the shape error, additional information such as acceleration, etc., is necessary, in addition to position information.

In particular, in the event a workpiece includes many curved surfaces, depending on the velocity at which a tool moves on the curved surfaces, the tangential acceleration and the normal acceleration also change. Consequently, the force that is applied from the tool to the machined surface of the workpiece also changes in accordance with such a change in acceleration. Then, the force that is applied to the machined surface influences the external appearance (stripe patterns, scratches, etc.) of the workpiece. Consequently, in order to analyze the shape error, physical information such as the acceleration and jerk of a drive axis or a tool is required.

Furthermore, according to the technique of Japanese Patent No. 4648471, it is necessary to check the acceleration of each drive axis separately, and it is therefore difficult to understand the association between acceleration and the machined surface visually. Also, acceleration according to Japanese Patent No. 3517909 is used to extract a singularity to equal or exceed a threshold, and therefore Japanese Patent No. 3517909 does not calculate acceleration in order to analyze shape error.

Furthermore, although Japanese Patent Application Publication No. 2009-98982 discloses displaying acceleration on a simulated tool path, Japanese Patent Application Publication No. 2009-98982 does not disclose displaying acceleration and so on, on the actual tool path. Consequently, with Japanese Patent Application Publication No. 2009-98982, it is not possible to analyze shape error in association with the actual machined surface.

The present invention has been made in view of the above backgrounds, and it is therefore an object of the present invention to provide a tool path display apparatus, which can easily analyze the shape error of the actual position of a drive axis or a tool, against the commanded position, and reduce the defects in the external appearance of a workpiece.

SUMMARY OF THE INVENTION

To achieve the above-stated object, according to the first aspect, a tool path display apparatus of a machine tool is provided, the tool path display apparatus displaying a path of a tip point of a tool of the machine tool controlling a position and posture of at least one of the tool and a workpiece by means of a plurality of drive axes using a numerical control apparatus, and the tool path display apparatus including: a command generation unit that generates position commands for the plurality of drive axes per predetermined control cycle; position detectors that are attached to each of the plurality of drive axes and that detect a position of each of the plurality of drive axes per predetermined control cycle; a position data acquiring unit that acquires the position commands generated by the command generation unit per predetermined control cycle, as commanded value time series data, and that acquires position detected values detected by the position detectors per predetermined control cycle, as detected value time series data; a tool coordinate value calculation unit that calculates a tool commanded coordinate value of a tip point of the tool, in association with the commanded value time series data, based on the commanded value time series data and a structure of the machine tool, and that also calculates a tool actual coordinate value of the tip point of the tool, in association with the detected value time series data, based on the detected value time series data and the structure of the machine tool; an acceleration calculation unit that calculates an acceleration or a jerk of the tip point of the tool using at least three pieces of data of the tool commanded coordinate values, and that also calculates the acceleration or the jerk of the tip point of the tool using at least three pieces of data of the tool actual coordinate values; and a display format selection unit that selects display formats of the accelerations or the jerks of the tool commanded coordinate values and the tool actual coordinate values constituting the path of the tip point of the tool, and, in this tool path display apparatus, the display format selection unit performs at least one of: color display to apply colors to the path of the tip point of the tool according to orientation and magnitude of the accelerations or the jerks; vector display to display the accelerations or the jerks as acceleration vectors or jerk vectors on the path of the tip point of the tool; and connection display to display a connection that connects between end points of neighboring acceleration vectors or jerk vectors and the tool path display apparatus further includes a display unit that displays the accelerations or the jerks, with the path of the tip of the tool, in accordance with the display formats selected by the display format selection unit.

According to a second aspect, based on the first aspect, the acceleration calculation unit calculates tangential or normal accelerations using at least three consecutive pieces of data of the tool commanded coordinate values and the tool actual coordinate values.

According to a third aspect, based on the first aspect, the acceleration calculation unit calculates tangential or normal jerks using at least four consecutive pieces of data of the tool commanded coordinate values and the tool actual coordinate values.

According to a fourth aspect, based on the first aspect, the display format selection unit changes a color or changes shading of the color of, and displays on the display unit, at least one of the path of the tip point of the tool, the acceleration vectors, the jerk vectors, the connection of the acceleration vectors and the connection of the jerk vectors, according to the orientation and magnitude of the accelerations or the jerks.

According to a fifth aspect, based on the first aspect, the display format selection unit displays, on the display unit, normal acceleration vectors or normal jerk vectors, in which a plurality of predetermined points in a straight line or a curved line connecting between mutually neighboring pieces of data of the tool commanded coordinate values or the tool actual coordinate values are starting points, and in which an intersection of a straight line that is perpendicular to a tangential line in each of the plurality of predetermined points and that passes a predetermined point, and a connection of the normal acceleration vectors or a connection of the normal jerk vectors, is an end point.

According to a sixth aspect, based on the first aspect, the display format selection unit changes a color or changes shading of the color of, and displays on the display unit, a plane surrounded by the acceleration vectors or the jerk vectors, the connection, and the path of the tip point of the tool.

According to a seventh aspect, based on the first aspect, the display format selection unit enlarges or reduces at least one of the acceleration vectors, the jerk vectors, the connection of the acceleration vectors and the connection of the jerk vectors, in a direction of the acceleration vectors or the jerk vectors, by an arbitrary magnification.

The objects, features, and characteristics of this invention other than those set forth above will become apparent from the description given herein below with reference to preferred embodiments illustrated in the accompanying drawings.

DETAILED DESCRIPTION

Embodiments of the present invention will be described below in detail with reference to the accompanying drawings. In the following drawings, the same members are assigned the same reference codes. The scale in these drawings is changed as appropriate for ease of explanation.

Figure 1:
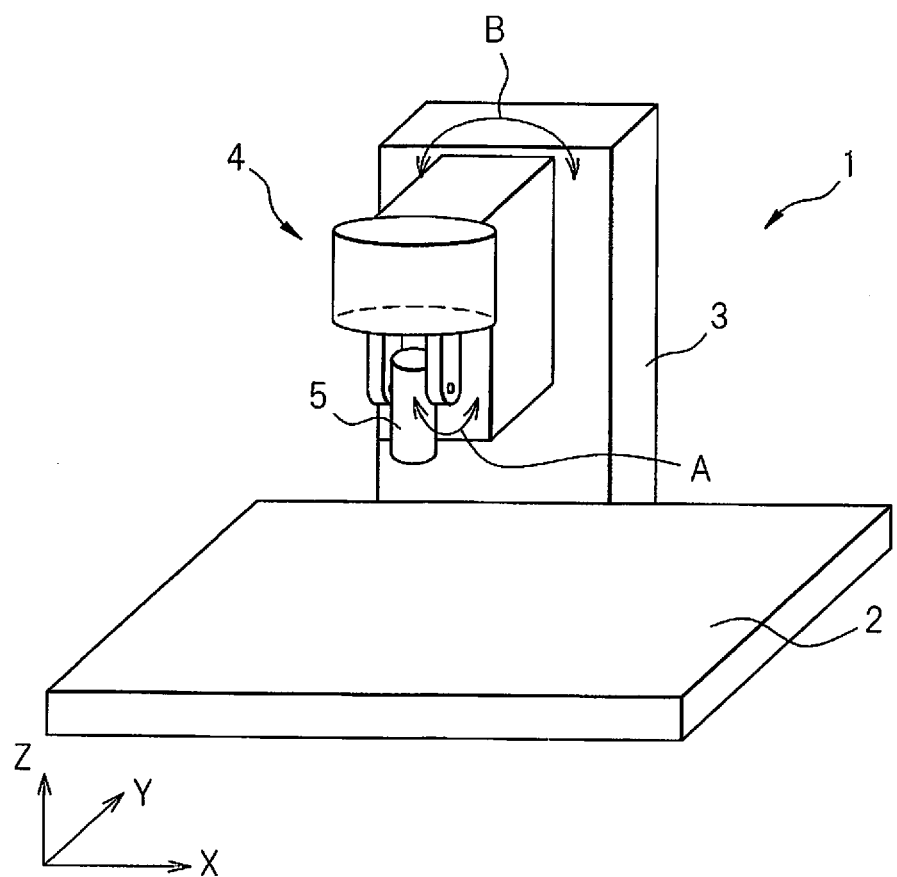
FIG. 1 is a perspective view of a machine tool on which a tool path display apparatus based on the present invention is mounted.

FIG. 1 is a perspective view of a machine tool on which a tool path display apparatus based on the present invention is mounted. The machine tool 1 illustrated as an example in FIG. 1 is a 5-axis machine tool. The machine tool 1 includes a table 2 on which a workpiece (not illustrated) is placed, and a pillar 3 that moves, relatively, in three directions (X axis, Y axis and Z axis) that are perpendicular to each other, with respect to the table 2. As illustrated in this drawing, a head 4 extends horizontally from the pillar 3, and the head 4 rotates around the B axis, which is parallel to the surface of the table 2. Furthermore, a tool 5, which can rotate around the A axis that is perpendicular to both the B axis and the surface of the table 2, is attached to the head 4. Consequently, the machine tool 1 controls the position and posture of the tool 5, by means of three linear-motion axes (X axis, Y axis and Z axis) and two rotary axes (A axis and B axis), and processes the workpiece on the table 2. However, even in the event the tool 5 is fixed to the table 2 and the workpiece (not illustrated) is attached to the tip of the head 4, this is within the scope of the present invention. Also, the X axis, Y axis, Z axis, A axis and B axis may also be referred to as "drive axes."

Figure 2:
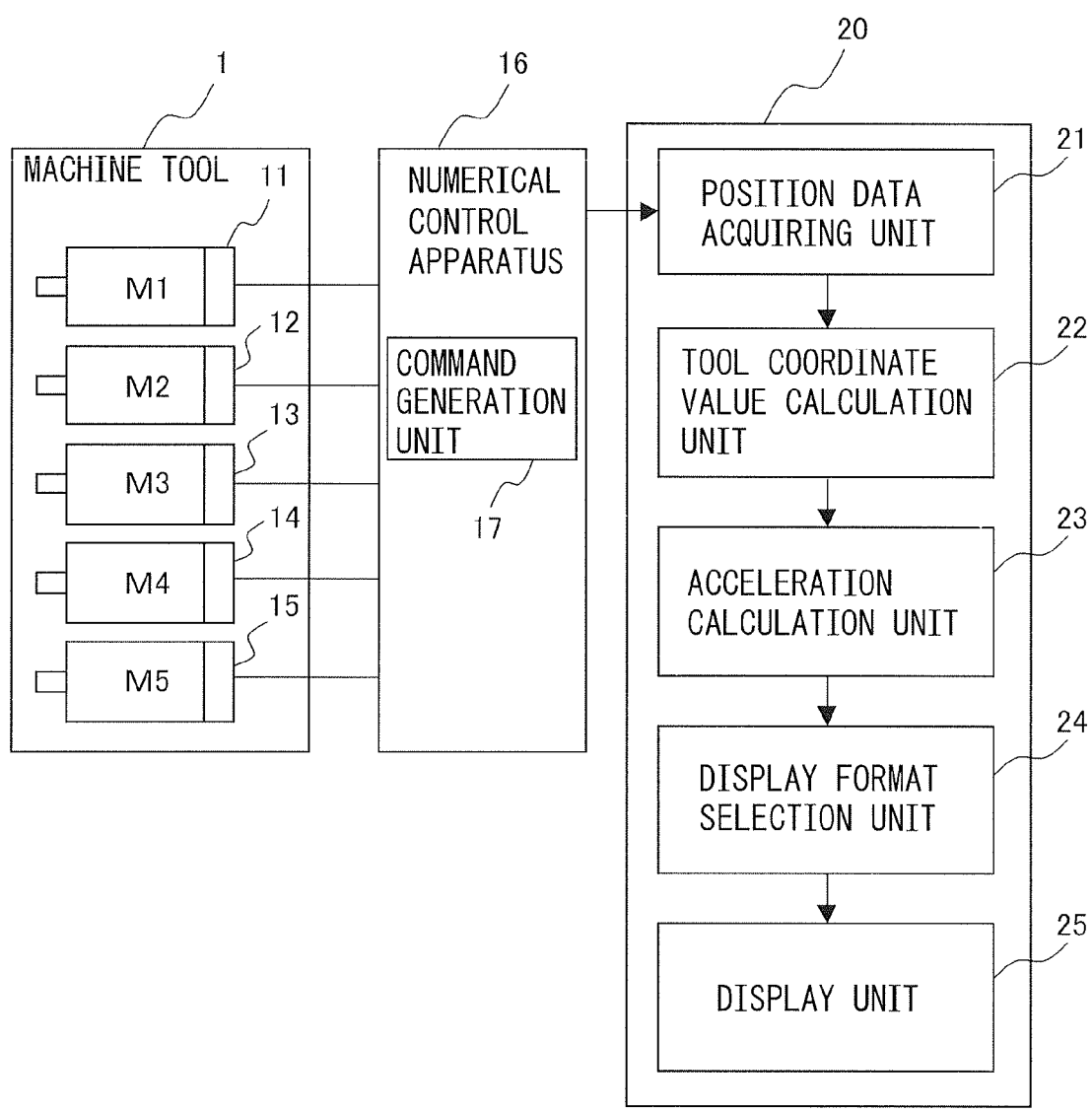
FIG. 2 is a functional block diagram of a tool path display apparatus based on the present invention.

FIG. 2 is a functional block diagram of a tool path display apparatus based on the present invention. As illustrated in FIG. 2, the tool path display apparatus 20 is connected to the machine tool 1 via a numerical control apparatus 16. The machine tool 1 includes motors M1 to M5, which drive each drive axis. These motors M1 to M5 are provided with position detectors 11 to 15, respectively, to detect the actual positions of the drive axes every predetermined control cycle.

Also, the numerical control apparatus 16 includes a command generation unit 17 that generates position commands for each drive axis per predetermined control cycle. Note that, in reality, the command generation unit 17 reads operation programs of the machine tool 1 and generates position commands for each axis.

As illustrated in FIG. 2, the tool path display apparatus 20 includes a position data acquiring unit 21. The position data acquiring unit 21 acquires the position commands, generated by the command generation unit 17 per predetermined control cycle, as commanded value time series data. Furthermore, the position data acquiring unit 21 acquires the position detected values of each drive axis, detected by the position detectors 11 to 15, as detected value time series data. These time series data are stored in the tool path display apparatus 20 on a temporary basis.

Furthermore, the tool path display apparatus 20 includes a tool coordinate value calculation unit 22. The tool coordinate value calculation unit 22 calculates the tool commanded coordinate values of the tip point of the tool 5, based on the commanded value time series data and the structure of the machine tool 1, in association with the commanded value time series data. Furthermore, the tool coordinate value calculation unit 22 calculates the tool actual coordinate values of the tip point of the tool 5, based on the detected value time series data and the structure of the machine tool 1, in association with the detected value time series data. These tool commanded coordinate values and tool actual coordinate values indicate the commanded path and the actual path of the tip point of the tool 5, respectively. Note that the structure of the machine tool 1 means primarily the dimensions of the machine tool 1.

Furthermore, the tool path display apparatus 20 includes an acceleration calculation unit 23. The acceleration calculation unit 23 calculates the acceleration and/or the jerk of the tip point of the tool 5 using at least three pieces of data of tool commanded coordinate values, and calculates the acceleration and/or the jerk of the tip point of the tool 5 using at least three pieces of data of tool actual coordinate values.

Furthermore, the tool path display apparatus 20 includes a display format selection unit 24. The display format selection unit 24 selects the display format for the acceleration and/or the jerk of at least one of tool commanded coordinate values and tool actual coordinate values.

To be more specific, the display format selection unit 24 performs at least one of: color display to apply colors to the path (commanded path or actual path) of the tip point of the tool 5 in accordance with the orientation and magnitude of acceleration or jerk; vector display to display acceleration or jerk as an acceleration vector or a jerk vector on the path of the tip point of the tool 5; and connection display to display connections that mutually connect the end points of neighboring acceleration vectors or jerk vectors.

It is preferable to have the operator select the display format in the display format selection unit 24. Alternately, the display format may be determined automatically according to the orientation and magnitude of acceleration or jerk. In accordance with the selected display format, acceleration or jerk is displayed on a display unit 25 in association with the path of the tip point of the tool 5.

Figure 3:
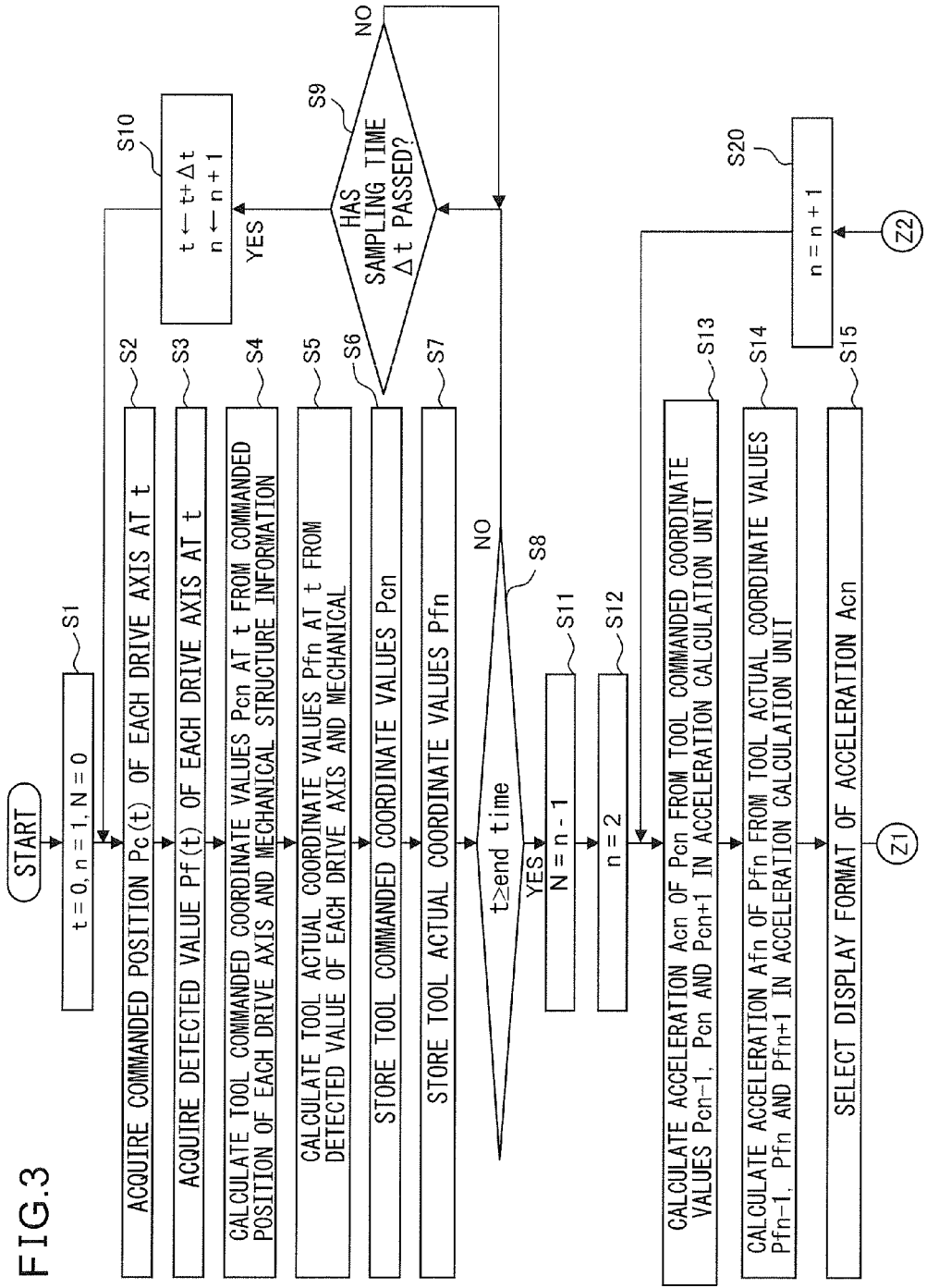
FIG. 3 is the first flowchart illustrating the operations of a tool path display based on the present invention.
Figure 4:
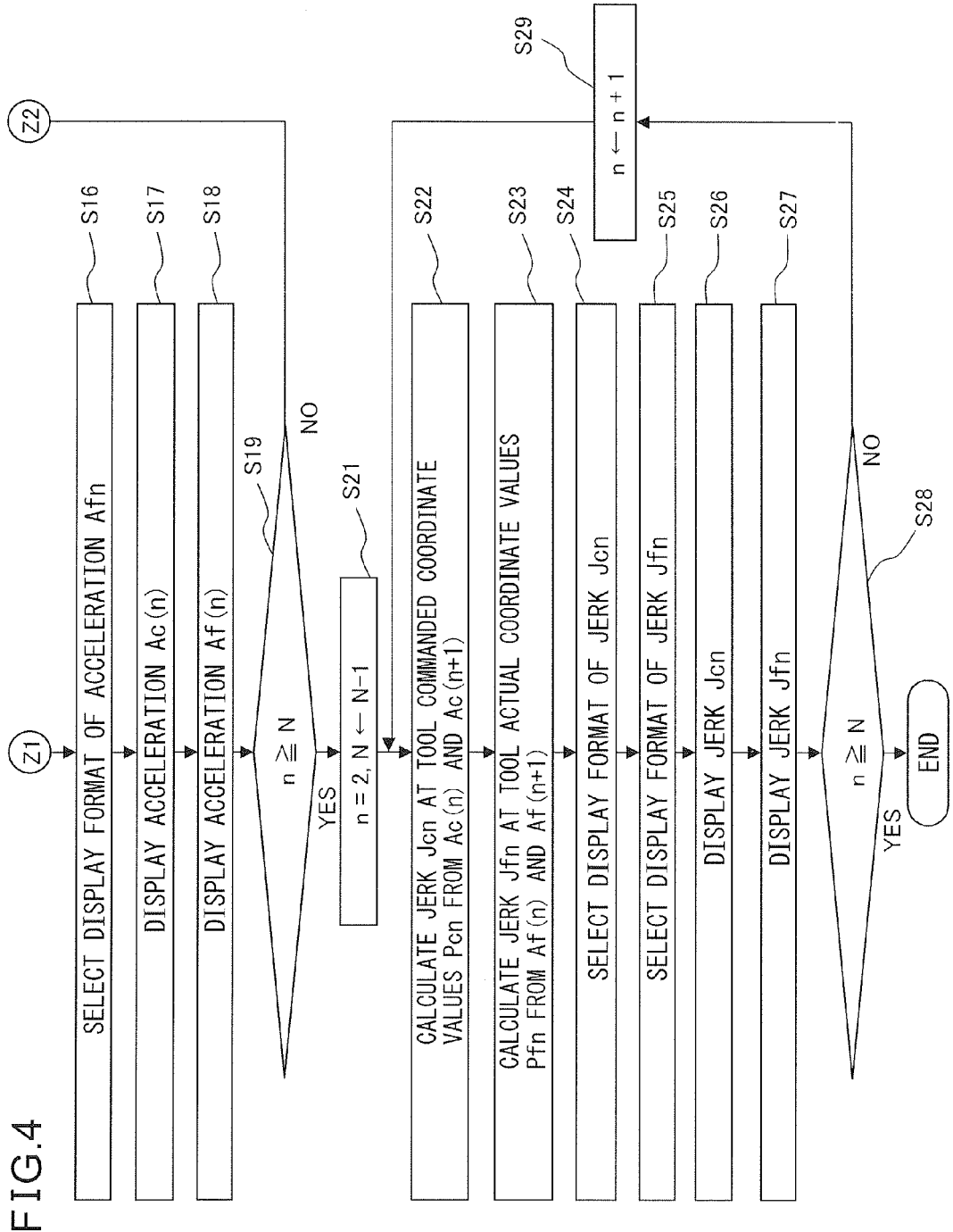
FIG. 4 is a second flowchart illustrating the operations of a tool path display apparatus based on the present invention.

FIG. 3 and FIG. 4 are flowcharts illustrating the operations of a tool path display apparatus based on the present invention. Now, the operation of the tool path display apparatus 20 based on the present invention will be described below with reference to FIG. 3 and FIG. 4. First, in step S1, t=0, n=1 and N=0 are set. In this connection, t is time, in which a predetermined control cycle is the unit, n is a value to represent the numbers of coordinate values, and N is the total number of coordinate values.

Then, in step S2, the position data acquiring unit 21 acquires the commanded position Pc(t) of each drive axis at time t, from the command generation unit 17. Then, in step S3, the position data acquiring unit 21 acquires the detected value Pf(t) of each axis at time t, detected by the position detectors 11 to 15.

Then, in step S4, the tool coordinate value calculation unit 22 calculates the tool commanded coordinate values Pcn at time t, based on the commanded position Pc(t) of each drive axis and the structure of the machine tool 1 (mechanical structure information). Likewise, in step S5, the tool coordinate value calculation unit 22 calculates the tool actual coordinate values Pfn at time t, based on the detected value Pf(t) of each drive axis and the structure of the machine tool 1 (mechanical structure information). These tool commanded coordinate values Pcn and tool actual coordinate values Pfn are stored in a storage unit (not illustrated) in the tool path display apparatus 20 (step S6 and step S7).

In this connection, the method of calculating the tool commanded coordinate values Pcn and tool actual coordinate values Pfn will be described. Referring back to FIG. 1, assume that the coordinates of the five axes are x(t), y(t), z(t), a(t) and b(t).

Given that the intersection of the A axis and the B axis is M, the coordinates of the intersection M are represented by (x(t), y(t), z(t)). Given that the length from the intersection M to the tip of the tool 5 is L and the position where the tool 5 is pointed straight downward is the reference position (origin) of the A axis and the B axis, the coordinates of the tip of the tool 5 are represented as follows:

$$Px(t) = x(t) + L \times \cos(a(t)) \times \sin(b(t))$$

$$Py(t) = y(t) + L \times \sin(a(t))$$

$$Pz(t) = z(t) - L \times \cos(a(t)) \times \cos(b(t))$$

In this way, the coordinates of the tip of the tool 5 can be calculated from position information of five axes and mechanical structure conditions.

Then, in step S8 in FIG. 3, whether or not time t has exceeded a predetermined end time is decided. In the event the decision is "NO," in step S9, further, whether or not sampling time Δt (which corresponds to the control cycle) has passed is decided. In the event the sampling time Δt has not passed, the sampling time Δt is waited to pass, and, when the sampling time Δt passes, the step proceeds to step S10.

In step S10, time t←t+Δt and n←n+1 are set, and the process returns to step S2. Then, step S2 to step S8 are repeated until time t exceeds the predetermined end time. By this means, the tool coordinate value calculation unit 22 can generate the commanded path and the actual path of the tip point of the tool 5 from commanded value time series data and detected value time series data.

Then, in step S11 and step S12, N=n−1 and n=2 are set respectively. Then, in step S13, the acceleration calculation unit 23 calculates an acceleration Acn using the tool commanded coordinate values Pcn−1, Pcn and Pcn+1. Likewise, in step S14, the acceleration calculation unit 23 calculates an acceleration Afn using the actual coordinate values Pfn−1, Pfn and Pfn+1. Upon calculating accelerations from three coordinate values in this way, it should be understood that the accelerations can be calculated in a short processing time. Note that the acceleration calculation unit 23 also performs the following calculations.

Then, in step S15 and step S16, the display format selection unit 24 selects the display formats of the accelerations Acn and Afn, respectively. Then, in step S17 and step S18, the accelerations Acn and Afn are displayed on the display unit 25 according to the selected display formats.

Then, in step S19 of FIG. 4, whether or not n has become equal to or greater than N is decided. In the event the decision is "NO," in step S20, n←n+1 is set, and the step returns to step S13. Then, steps S13 to S19 are repeated until n becomes equal to or greater than N.

Then, in step S21, n=2 and N←N−1 are set. Then, in step S22, the jerk Jcn at the tool commanded coordinate values Pcn is calculated from the accelerations Ac(n) and Ac(n+1). Likewise, in step S23, the jerk Jfn at the actual coordinate values Pfn is calculated from the accelerations Af(n) and Af(n+1).

With the present invention, a jerk is calculated using two accelerations, and therefore note that at least four tool coordinate values are used. It should be understood that, in the event a jerk is calculated from four coordinate values, the jerk can be calculated in a short processing time.

Then, in step S24 and step S25, the display format selection unit 24 selects the display formats for the jerks Jcn and Jfn. Then, in step S26 and step S27, the jerks Jcn and Jfn are displayed on a display unit 25 according to the selected display formats. Note that it is preferable to display the jerks Jcn and Jfn in different positions on the display unit 25 so as not to overlap the accelerations Acn and Afn.

After that, in step S28, in the event n≥N is decided, the process is terminated. In the event n≥N is not determined, in step S29, n←n+1 is set, and the steps S22 to step S27 are repeated until n≥N.

Figure 5:
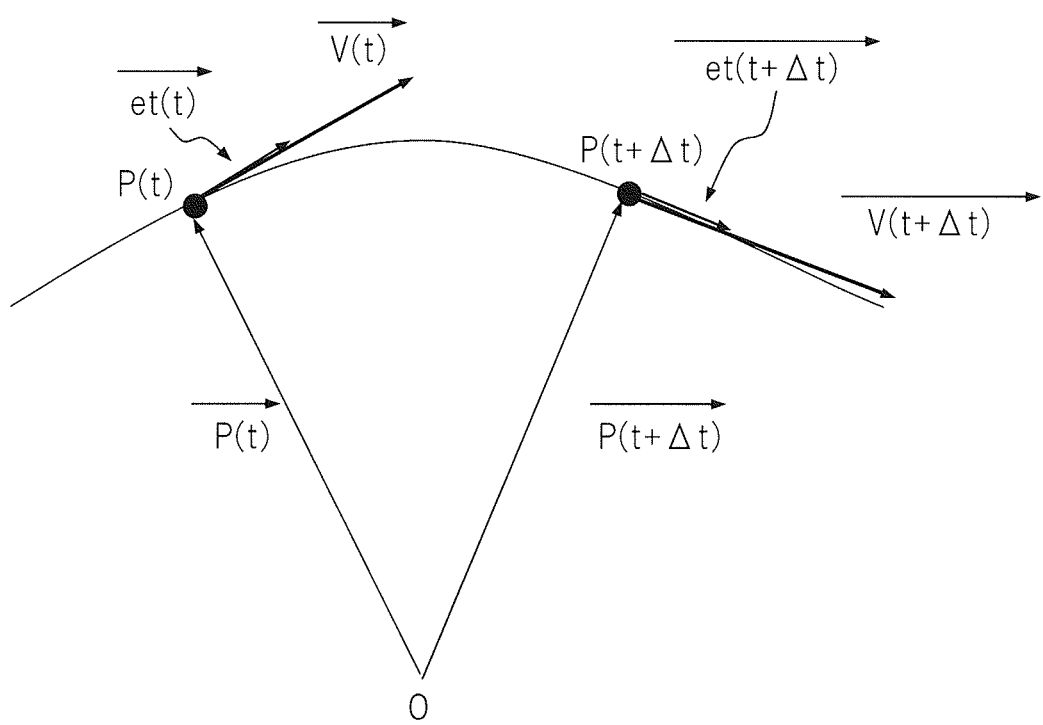
FIG. 5 is a view for explaining calculation of acceleration.

In this connection, referring to FIG. 5, the calculation of acceleration will be described. Assume that the following calculation is performed by the acceleration calculation unit 23. As illustrated in FIG. 5, assume that the position vector at point P(t) at time t is $\overrightarrow{P(t)}$, the position vector at point P(t+Δt) after time Δt is $\overrightarrow{P(t+\Delta t)}$. In this case, the velocity vector $\overrightarrow{V(t)}$ at point P(t) is calculated by equation 1. Then, by dividing the velocity vector $\overrightarrow{V(t)}$ by the magnitude thereof as shown in equation 2, a tangential unit vector $\overrightarrow{et(t)}$ at point P(t) is determined.

$$\overrightarrow{V(t)} = \lim_{\Delta t \to 0} \frac{\overrightarrow{P(t+\Delta t)} - \overrightarrow{P(t)}}{\Delta t} \quad \text{(Equation 1)}$$

$$\overrightarrow{et(t)} = \frac{\overrightarrow{V(t)}}{|\overrightarrow{V(t)}|} \quad \text{(Equation 2)}$$

Then, as shown in equation 3, the acceleration vector $\overrightarrow{A(t)}$ at point P(t) is calculated. Then, by calculating the inner product of the acceleration vector $\overrightarrow{A(t)}$ and the vector $\overrightarrow{et(t)}$ which is parallel to the tangential line calculated from equation 2 and which has a magnitude of 1, the tangential acceleration vector $\overrightarrow{At(t)}$ at point P(t) is determined as shown in equation 4.

As for the normal acceleration vector at point P(t), by subtracting the tangential acceleration vector $\overrightarrow{At(t)}$ from the acceleration vector, a normal acceleration vector $\overrightarrow{An(t)}$ is calculated as shown in equation 5.

Furthermore, by differentiating the acceleration vector at point P(t) as shown in equation 6, a jerk vector $\overrightarrow{J(t)}$ is calculated. The tangential jerk $\overrightarrow{Jt(t)}$ and the normal jerk $\overrightarrow{Jn(t)}$ are also calculated likewise by differentiation.

$$\overrightarrow{A(t)} = \lim_{\Delta t \to 0} \frac{\overrightarrow{V(t+\Delta t)} - \overrightarrow{V(t)}}{\Delta t} \quad \text{(Equation 3)}$$

$$\overrightarrow{At(t)} = (\overrightarrow{A(t)} \cdot \overrightarrow{et(t)})et(t) \quad \text{(Equation 4)}$$

$$\overrightarrow{An(t)} = \overrightarrow{A(t)} - \overrightarrow{At(t)} \quad \text{(Equation 5)}$$

$$\overrightarrow{J(t)} = \lim_{\Delta t \to 0} \frac{\overrightarrow{A(t+\Delta t)} - \overrightarrow{A(t)}}{\Delta t} \quad \text{(Equation 6)}$$

Figure 6:
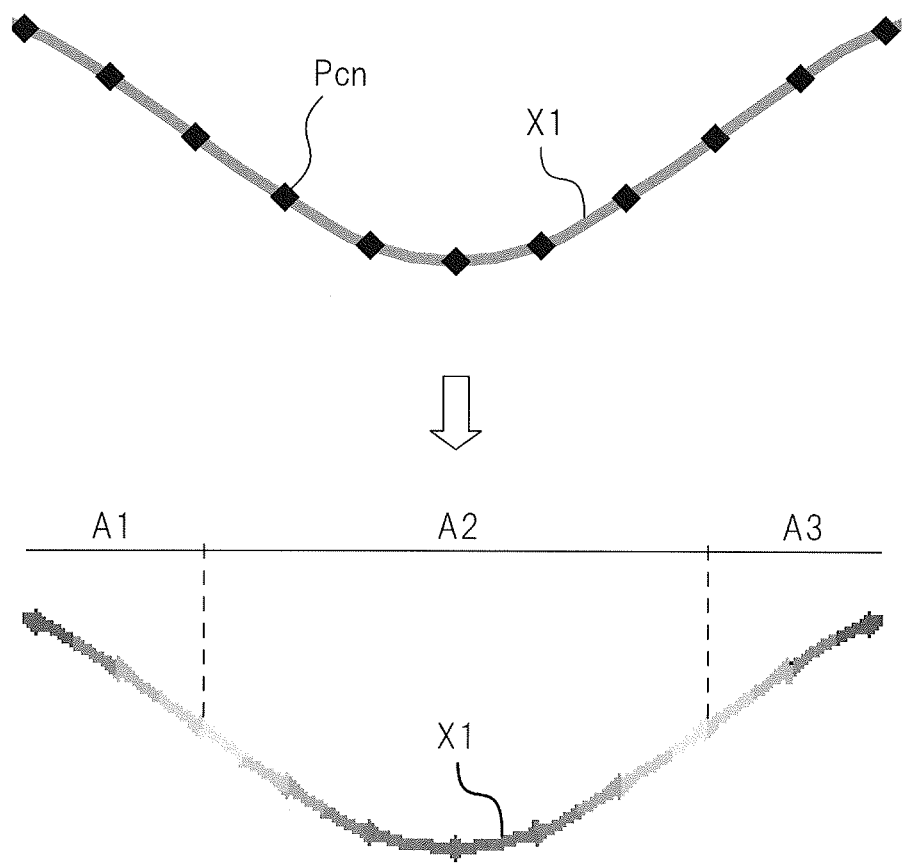
FIG. 6 is a view for explaining color display in a display format selection unit.
Figure 7:
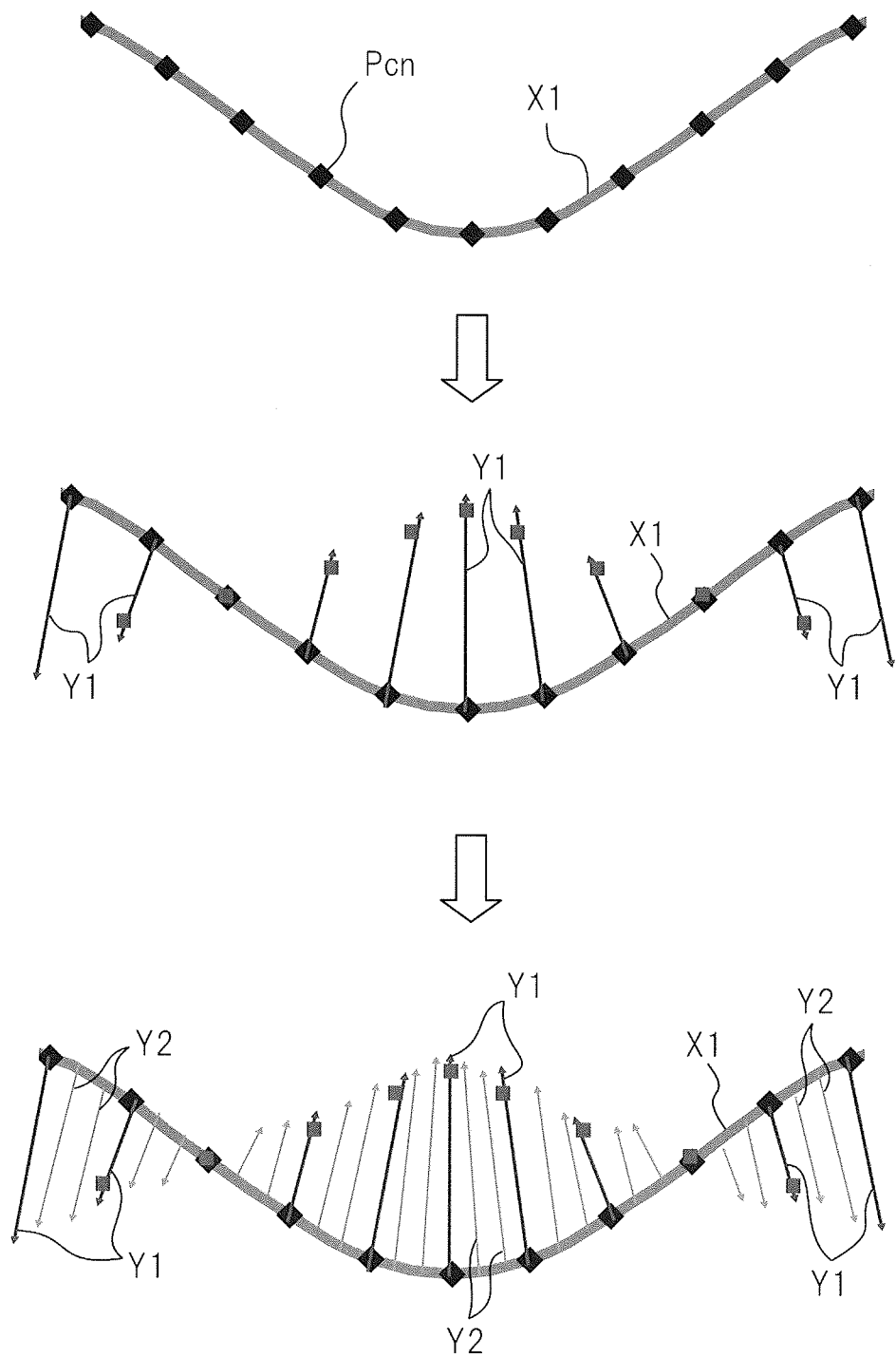
FIG. 7 is a view for explaining vector display in a display format selection unit.
Figure 8:
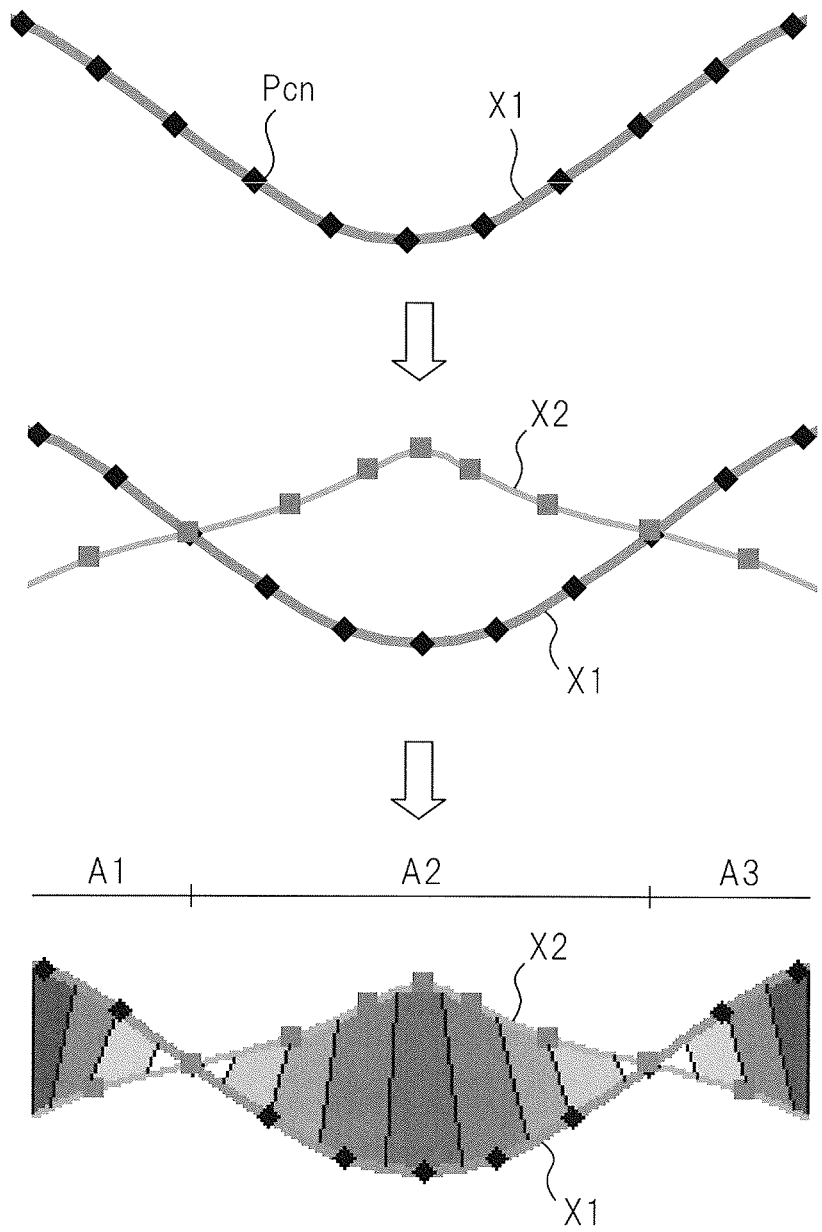
FIG. 8 is a view for explaining connection display in a display format selection unit.

Incidentally, the display format selection unit 24 according to the present invention executes at least one of color display, vector display and connection display, with respect to acceleration and/or jerk. FIG. 6 to FIG. 8 are views for explaining the color display, vector display and connection display in the display format selection unit 24, respectively. In the following drawings, for ease of explanation, the normal acceleration with respect to tool commanded coordinate values Pcn will be described as an example. However, note that, in the event of actual coordinate values Pfn, the case of displaying the tangential acceleration and the case of displaying the jerk are substantially the same.

First, color display will be described with reference to FIG. 6. In FIG. 6, tool commanded coordinate values Pcn and a solid line X1 which connects them by a straight line or a curved line are illustrated. This solid line X1 indicates a commanded path of the tip point of the tool 5. As illustrated in the lower part of FIG. 6, the solid line X1 includes areas A1 and A3, in which the normal acceleration is pointed upward above the solid line X1, and an area A2, in which the normal acceleration is pointed downward below the solid line X1.

In color display, the areas A1 and A3, in which the normal acceleration is pointed upward above the solid line X1, are colored by the first color (blue for example), and the area A2, in which the normal acceleration is pointed downward below the solid line X1, is colored by a second color (red for example).

In this connection, it is preferable to change the shading of the first and second colors depending on the magnitude of normal acceleration. In the example illustrated in FIG. 6, a thin color is displayed near the inflection point of solid line X1, and a thick color is displayed near the extrema of the solid line X1. Then, shading is given such that the color changes gradually between the inflection point and the extrema. In color display, the operator is able to recognize the condition of acceleration at ease, only by changing the color partly or by changing the shading. Note that, in color display, in addition to use of the first and second colors, it is also possible to use a greater number of colors and apply colors between the inflection point and the extrema.

Then, with reference to FIG. 7, vector display in the display format selection unit 24 will be explained. In the center of FIG. 7, normal accelerations are shown in vector display, extending from each of the tool commanded coordinate values Pcn in the solid line X1. The orientation of these normal acceleration vectors Y1 show the direction of the normal accelerations, and the norm thereof shows the magnitude of the normal accelerations.

Furthermore, in the event of vector display, as illustrated in the lower part of FIG. 7, one or a plurality of normal acceleration vectors Y2 may be displayed between two neighboring vectors Y1. Such vectors Y2 extend from the solid line X1 between two neighboring tool commanded coordinate values Pcn. A person skilled in the art should understood that the vectors Y2 can be calculated easily from the vectors Y1 and the solid line X1. In vector display, by interpolating and displaying normal acceleration vectors or normal jerk vectors between neighboring data of the path of the tip point of the tool, the operator is able to easily recognize the normal acceleration vectors or normal jerk vectors visually.

Then, referring to FIG. 8, connection display in the display format selection unit 24 will be described. In the center of FIG. 8, only the end points of acceleration vectors that extend from each of the tool commanded coordinate values Pcn are displayed, and a solid line X2 to connect them by a straight line or a curved line is illustrated. As is clear from the drawing, the solid line X1 crosses the solid line X2 at its inflection points.

Furthermore, as illustrated in the lower part of FIG. 8, by further combining color display, the first color (blue, for example) is displayed in shading in the areas A1 and A3, and a second color (red, for example) is displayed in shading in the area A2. In addition, it is equally possible to apply different colors, from the color of the solid line X1, to the acceleration vectors, jerk vectors and connections, or change their shading. It should be understood that, by selecting two or more display formats in this way, it is possible to provide a variety of display formats, so that the operator is allowed easier recognition.

Figure 9:
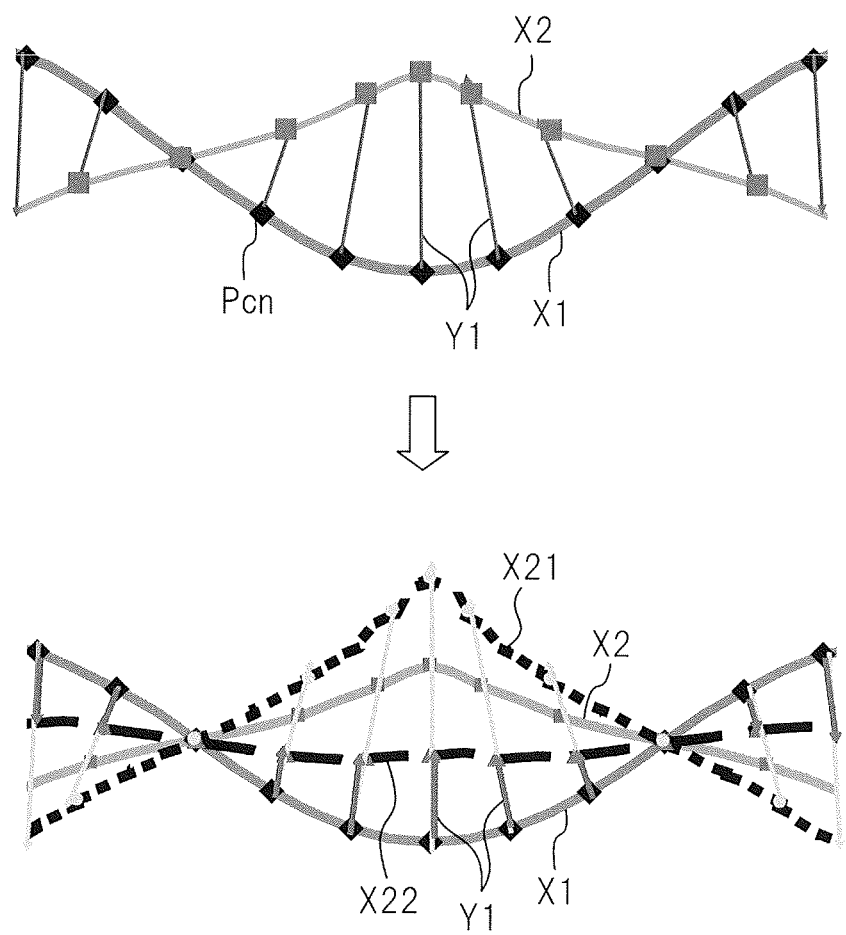
FIG. 9 is a view for explaining other functions of a display format selection unit.

FIG. 9 is a view for explaining other functions of the display format selection unit 24. In the event change in the solid line X2 and the like is comparatively small, cases might occur where the operator is unable to read a change on the display unit 25. In this case, it is preferable to enlarge the solid line X2 vertically by the enlargement/reduction function. In FIG. 9, a broken line X21, which is given by enlarging the solid line X2 1.5 times vertically, is illustrated. By this means, the operator is assisted in reading change.

Alternately, in the event change with the solid line X2 and so on is comparatively significant, there is a possibility that the entirety of the solid line X2 cannot be displayed in the display unit 25. In this case, it is preferable to reduce the solid line X2 vertically by the enlargement/reduction function. In FIG. 9, a broken line X22, which is given by reducing the solid line X2 0.5 times vertically, is illustrated. In this case, it is possible to display the entirety of the broken line X22 in the display unit 25.

Thus, with the present invention, the path of the tip of the tool 5 is displayed with respect to both commanded values and detected values, and, at each of the coordinate values, the accelerations (normal acceleration and tangential acceleration) or jerks are displayed on the display unit 25 in various display formats. Consequently, the operator of the machine tool 1 is able to analyze the cause of shape error on the machined surface of the workpiece or the cause of the difference between the path of the command values and the path of the detected values, in association with the accelerations.

Furthermore, since the shape error on the machined surface and normal acceleration can be associated with each other and analyzed, the operator is able to optimize the feed velocity of the tool 5 on the curved machined surface of the workpiece. As a result of this, it is possible to make the machined surface of the workpiece smooth.

Note that, even in the event the position detectors 11 to 15 and the command generation unit 17 are included in the tool path display apparatus 20, this is still within the scope of the present invention.

EFFECTS OF THE INVENTION

According to the first aspect, accelerations or jerks are displayed together in association with a commanded path and the actual path of the tip point of the tool. Consequently, the operator of the machine tool is able to analyze the cause of shape error on the machined surface of a workpiece or the cause of the difference between the commanded path and the actual path, in association with the accelerations. As a result of this, the operator is able to optimize the feed velocity of the tool on the machined surface of the workpiece and reduce the defects with the external appearance of the workpiece.

According to the second aspect, it is possible to calculate accelerations in a short time using three pieces of data.

According to the third aspect, it is possible to calculate jerks in a short time using four pieces of data.

According to the fourth aspect, the operator is able to recognize the condition of accelerations easily only by changing the color partly or by changing the shading.

According to the fifth aspect, by interpolating and displaying a normal acceleration vector and a normal jerk between neighboring pieces of data on the path of the tip point of the tool, the operator is able to recognize the normal acceleration vector or the normal jerk vector more easily.

According to the sixth aspect, the plane surrounded by the path, vectors and connection is displayed in color display, so that the operator is able to recognize quite easily.

According to the seventh aspect, in the event the operator is unable to read change on the display unit 25, the operator is given assist in reading, by an enlargement function, and, in the event the entirety of the vectors and connections and so on cannot be displayed in the display unit 25, the entirety of the vectors and connections and so on can be displayed in the display unit 25 by means of a reduction function.

Although the present invention has been described using typical embodiments, a person skilled in the art should understand that the above-described changes, and various other changes, omissions, and additions are possible without departing from the scope of the present invention.

The invention claimed is:

1. A tool path display apparatus of a machine tool, the tool path display apparatus configured for displaying a path of a tip point of a tool of the machine tool, the machine tool configured for controlling a position and posture of at least one of the tool and a workpiece by a plurality of drive axes using a numerical control apparatus, the tool path display apparatus comprising:
   a command generation unit configured to generate position commands for the plurality of drive axes per predetermined control cycle;
   position detectors that are attached to each of the plurality of drive axes and configured to detect a position of each of the plurality of drive axes per predetermined control cycle;
   a position data acquiring unit configured to
      aquire the position commands generated by the command generation unit per predetermined control cycle, as commanded value time series data, and
      aquire position detected values detected by the position detectors per predetermined control cycle, as detected value time series data;
   a tool coordinate value calculation unit configured to
      calculate a tool commanded coordinate value of the tip point of the tool, in association with the commanded value time series data, based on the commanded value time series data and a structure of the machine tool, and
      calculate a tool actual coordinate value of the tip point of the tool, in association with the detected value time series data, based on the detected value time series data and the structure of the machine tool;
   an acceleration calculation unit configured to
      calculate an acceleration or a jerk of the tip point of the tool using at least three pieces of data of the tool commanded coordinate values, and
      calculate the acceleration or the jerk of the tip point of the tool using at least three pieces of data of the tool actual coordinate values; and
   a display format selection unit configured to select display formats of the accelerations or the jerks of the tool commanded coordinate values and the tool actual coordinate values constituting the path of the tip point of the tool, wherein
   the display format selection unit is configured to perform at least one of:
      vector display to display the accelerations or the jerks as acceleration vectors or jerk vectors on the path of the tip point of the tool; and
      connection display to display a connection that connects between end points of neighboring acceleration vectors or jerk vectors, and the tool path display apparatus further comprises a display unit configured to display the accelerations or the jerks, with the path of the tip point of the tool, in accordance with the display formats selected by the display format selection unit.

2. The tool path display apparatus as defined in claim 1, wherein the acceleration calculation unit is configured to calculate tangential or normal accelerations using at least three consecutive pieces of data of the tool commanded coordinate values and the tool actual coordinate values.

3. The tool path display apparatus as defined in claim 1, wherein the acceleration calculation unit is configured to calculate tangential or normal jerks using at least four consecutive pieces of data of the tool commanded coordinate values and the tool actual coordinate values.

4. The tool path display apparatus as defined in claim 1, wherein the display format selection unit is configured to display, on the display unit, normal acceleration vectors or normal jerk vectors which have starting points and end points,
the starting points are defined by a plurality of predetermined points in a straight line or a curved line connecting between mutually neighboring pieces of data of the tool commanded coordinate values or the tool actual coordinate values, and each of the end points is defined by an intersection of
a straight line that is perpendicular to a tangential line at a corresponding predetermined point among the plurality of predetermined points and that passes through said corresponding predetermined point, and
a connection of the normal acceleration vectors or a connection of the normal jerk vectors.

5. The tool path display apparatus as defined in claim 1, wherein the display format selection unit is configured to enlarge or reduce at least one of the acceleration vectors, the jerk vectors, the connection of the acceleration vectors and the connection of the jerk vectors, in a direction of the acceleration vectors or the jerk vectors, by an arbitrary magnification.

\* \* \* \* \*